UNITED STATES PATENT OFFICE.

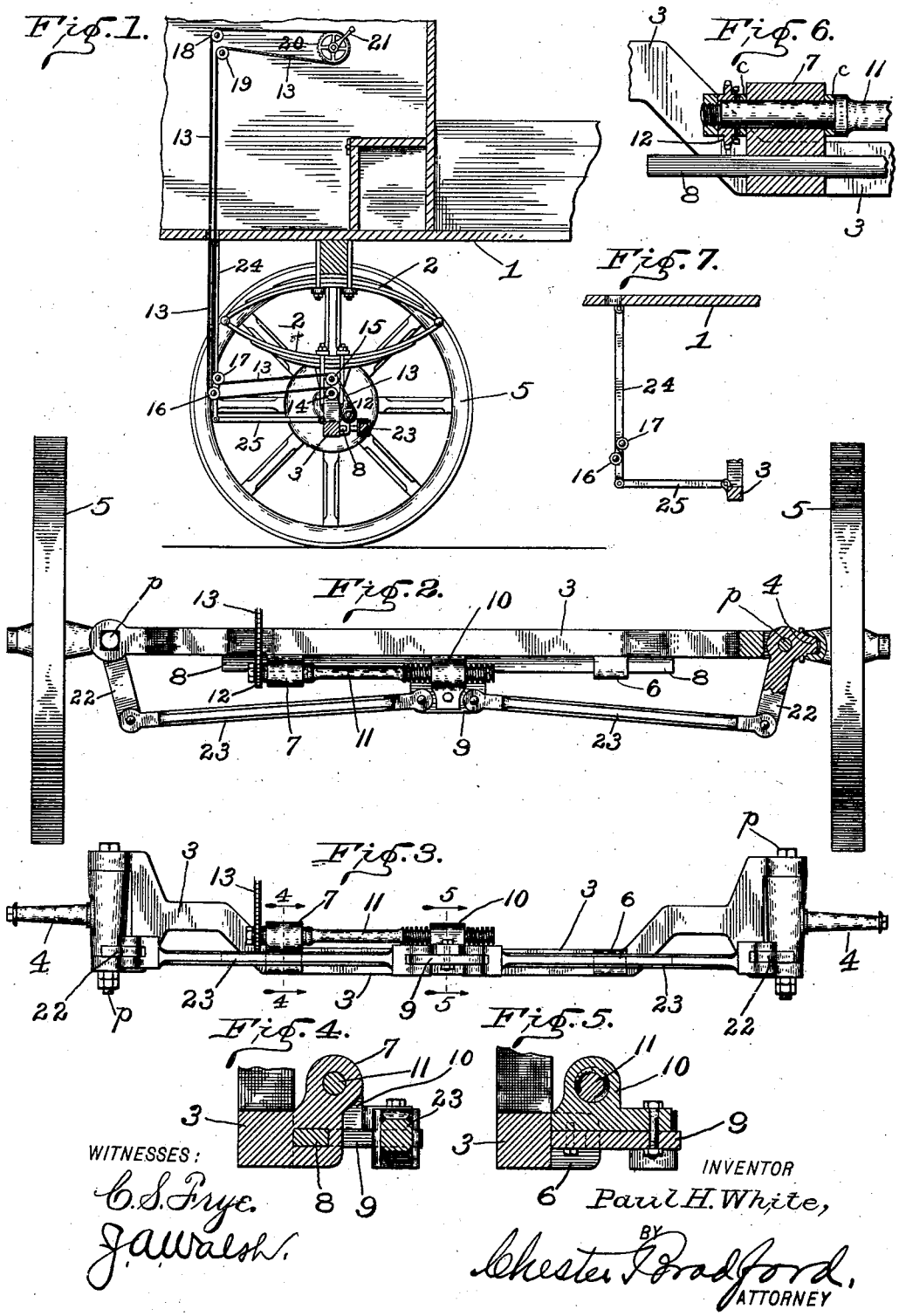

PAUL H. WHITE, OF INDIANAPOLIS, INDIANA, ASSIGNOR TO THE WHITE STEAM WAGON COMPANY, OF INDIANAPOLIS, INDIANA, A CORPORATION OF INDIANA.

STEERING-GEAR FOR VEHICLES.

SPECIFICATION forming part of Letters Patent No. 686,684, dated November 12, 1901.

Application filed March 11, 1901. Serial No. 50,655. (No model.)

*To all whom it may concern:*

Be it known that I, PAUL H. WHITE, a citizen of the United States, residing at Indianapolis, in the county of Marion and State of Indiana, have invented certain new and useful Improvements in Steering-Gear for Vehicles, of which the following is a specification.

My present invention relates to that variety of steering-gears for vehicles wherein the wheel-spindles are pivoted to the ends of the axle instead of having the axle pivoted by means of a fifth-wheel, being, generally speaking, what is commonly known as the "Ackermann" system. Said invention consists in connecting the coupling-block, carrying the inner ends of the links, by which the levers on the wheel-spindles are controlled, to the axle itself at a point intermediate its ends, so that the thrust on said links shall be received by the axle and the whole axle thus be self-contained.

In steering-gears of the system in question in that construction wherein the links are connected to a coupling-block carried by the vehicle-body it is not only somewhat difficult to operate the steering-gear, but whenever the wheels come in contact with any obstruction the body is given a violent lurch, sometimes throwing out the occupants or doing other damage. By means of my invention such disadvantages are wholly overcome, while the steering-gear is easily and quickly operated and controlled, as will be hereinafter more particularly described and claimed.

Referring to the accompanying drawings, which are made a part hereof, and on which similar reference characters indicate similar parts, Figure 1 is a vertical sectional view through a portion of a vehicle-body provided with my improved steering-gear and showing especially how said steering-gear is operated; Fig. 2, a top or plan view, on an enlarged scale, of an axle and the vehicle-wheel carried thereby, the same being provided with my improved steering-gear, a fragment being broken away or shown in section at one end, where the wheel-spindle is pivoted to the axle, for purposes of clearness; Fig. 3, a rear elevation of an axle equipped with such steering-gear; Fig. 4, a detail transverse sectional view, on a still further enlarged scale, on the dotted line 4 4, Fig. 3; Fig. 5, a similar view on the dotted line 5 5; Fig. 6, a detail view showing the bearing of the screw-rod in section, and Fig. 7 a view showing the link-frame carrying the idlers unobscured by the link belt.

The vehicle-body 1, spring 2, wheel-spindles 4, and wheels 5 are similar to corresponding parts previously made and used, and not being peculiar to my present invention will not be further described herein except incidentally in describing the invention.

The axle 3 is provided with extensions 6 and 7, within which are bearings for the bar 8, to which the coupling-block 9 is rigidly connected. Upon this coupling-block 9 is rigidly secured a large nut 10, with which the screw-threaded portion of the screw-rod 11 engages, the other end of said screw-rod being mounted in a bearing in the upper portion of the rigid extension 7 on the axle 3, where it is held from endwise movement by suitable collars *c*, as best shown in Fig. 6. On the end of the screw-rod 11 is a sprocket-wheel 12, and a link belt 13 runs therefrom, preferably over idlers 14, 15, 16, 17, 18, and 19, to a second sprocket-wheel 20 up within the body of the vehicle at a point convenient to the operator. This wheel is preferably provided with a crank-handle 21, by means of which the operator may conveniently turn the sprocket-wheel 20, and thus through the link belt 13 and sprocket-wheel 12 drive the screw 11, which in turn, through its nut 10, will move the coupling-block 9 back and forth. Lever-arms 22, rigidly connected to or formed in piece with the wheel-spindles 4, are connected by means of the links 23 with the coupling-block 9, and thus as said coupling-block is moved in one direction or the other by means of the screw-rod 11 the levers and spindles are turned on their pivots *p*, as hereinbefore indicated. By means of this arrangement the thrust from the wheels and wheel-spindles is all received by the axle itself through the coupling-block 9, its bar 8, and the screw-rod 11, connected, as stated, to the projections 6 and 7 on the axle.

It is necessary in order that the link belt 13 shall be continuously operative, notwithstanding the presence of the spring 2 and the consequent variation in distance between the vehicle-body 1 and the axle 3, that certain of the idlers over which said link belt runs shall be carried by a swinging frame, whose variation of motion is the same as that of the vehicle-body relative to the axle. I have therefore provided a frame to carry the idler-rollers 16 and 17, which frame is composed of the two bars 24 and 25, which are pivoted to each other where they come together, the upper one being also pivoted to the vehicle-body and the lower one to the axle, as shown in Figs. 1 and 7.

Having thus fully described my said invention, what I claim as new, and desire to secure by Letters Patent, is—

1. The combination, in a steering-gear for vehicles, of the axle, wheel-spindles pivoted to the ends of said axle and having lever-arms extending out therefrom, links connected at their outer ends to said lever-arms and at their inner ends to a coupling-block, said coupling-block mounted in bearings on said axle, a revoluble screw-rod connecting said coupling-block with a rigid extension on said axle which constitutes a bearing for said screw-rod and holds the same in fixed longitudinal relation therewith, and means for revolving said screw-rod, whereby said coupling-block may be moved longitudinally of said axle and the steering of the vehicle thus accomplished, while the thrust of the apparatus is received by the axle itself.

2. The combination, in a vehicle, of the body, the axle, the wheels, spindles carrying said wheels pivoted to the ends of said axle and provided with lever-arms extending out therefrom, links connected at the outer ends to said lever-arms and at the inner ends to a coupling-block, said coupling-block, a bar extending longitudinally of the axle with which said coupling-block is rigidly connected, bearings rigidly upon the axle wherein said bar is carried and adapted to move, a revoluble screw-rod connecting said coupling-block with a rigid extension on the axle forming a bearing for the screw-rod, and means for revolving said screw-rod and thus driving said coupling-block and bar longitudinally of said axle, said several parts being constructed, arranged and operating substantially as shown and described.

3. The combination, in a steering-gear for vehicles, of an axle, wheel-spindles pivoted to said axle, links connected to said wheel-spindles at the outer end and to a coupling-block at the inner end, a screw-rod mounted on the axle and connected to said coupling-block, a belt running from a suitable wheel on said screw-rod over idlers and up into the vehicle to a point convenient to the operator, and a frame pivoted to the vehicle and to the axle carrying certain of said idlers, whereby slack in said belt which would otherwise result from motion of said bed is prevented, substantially as set forth.

4. The combination, in a steering-gear for vehicles, with the actuating screw-rod thereof, of a belt for driving said screw-rod, wheels over which said belt runs, idlers intermediate the ends of said belt over which it also runs, and a frame composed of a vertical member 22 and a horizontal member 23 pivoted together and to the vehicle-body and to the axle, respectively, substantially as shown and described and for the purposes specified.

In witness whereof I have hereunto set my hand and seal at Indianapolis, Indiana, this 4th day of March, A. D. 1901.

PAUL H. WHITE. [L. S.]

Witnesses:
 CHESTER BRADFORD,
 NETTIE ADAMS.